E. A. HILL.
WEATHER STRIP CONSTRUCTION FOR FREIGHT CAR DOORS.
APPLICATION FILED AUG. 5, 1911.
1,033,172.
Patented July 23, 1912.
2 SHEETS—SHEET 1.
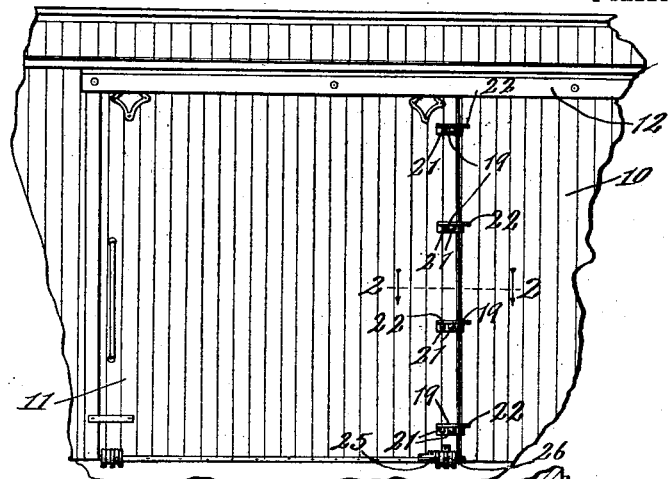
Fig. 1.
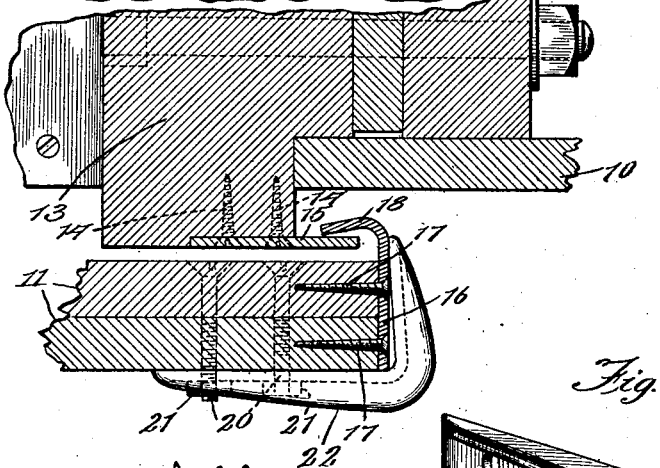
Fig. 2.
Fig. 4.
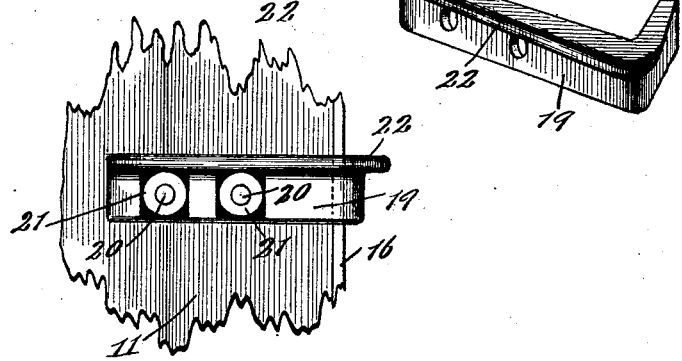
Fig. 3.
Witnesses:
Inventor:
Edward A. Hill
By S. R. Barnett
Atty.
COLUMBIA PLANOGRAPH CO., WASHINGTON, D. C.

E. A. HILL.
WEATHER STRIP CONSTRUCTION FOR FREIGHT CAR DOORS.
APPLICATION FILED AUG. 5, 1911.
1,033,172.
Patented July 23, 1912.
2 SHEETS—SHEET 2.
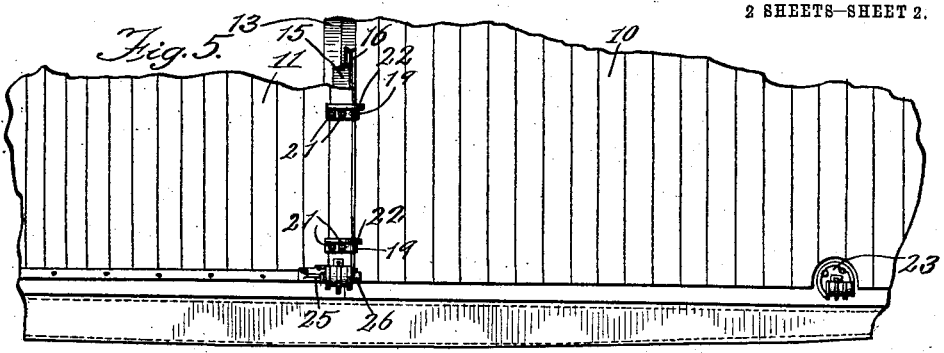
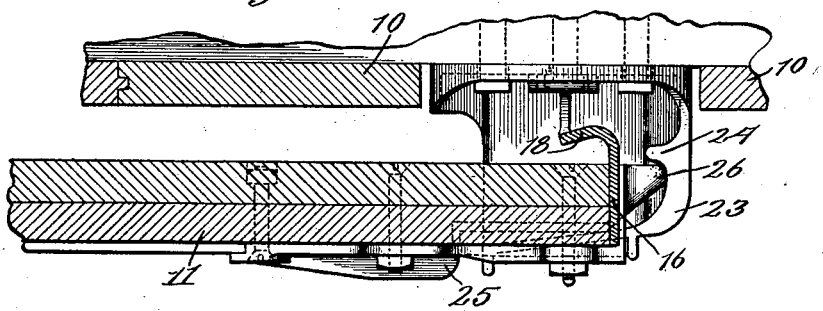
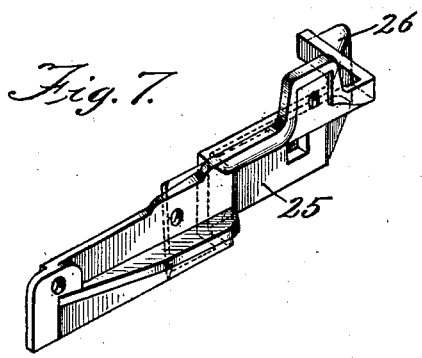

UNITED STATES PATENT OFFICE.

EDWARD A. HILL, OF CHICAGO, ILLINOIS, ASSIGNOR TO CHICAGO CAR DOOR COMPANY, OF CHICAGO, ILLINOIS, A CORPORATION OF ILLINOIS.

WEATHER-STRIP CONSTRUCTION FOR FREIGHT-CAR DOORS.

1,033,172.   Specification of Letters Patent.   Patented July 23, 1912.

Application filed August 5, 1911. Serial No. 642,561.

*To all whom it may concern:*

Be it known that I, EDWARD A. HILL, a citizen of the United States, residing at Chicago, in the county of Cook and State of Illinois, have invented certain new and useful Improvements in Weather-Strip Construction for Freight-Car Doors, of which the following is a specification.

My invention relates to weather strip constructions for freight car doors of the sliding type, and the invention has for its object to provide improved means for closing or covering the crack or space at the rear edge of the door intervening between the door and the door post or other part of the car body back of the door so as to prevent the entrance into the car of rain, snow, cinders, sparks, dust and the like; the improvements consisting of certain novel devices and arrangements which, in addition to effectually protecting the contents of the car from damage in the manner indicated, also stiffen, strengthen and reinforce the rear edge of the door thereby preventing the same from warping or becoming injured with use, and which further provide a weather strip construction that is very strong and durable and capable of withstanding the hard usage to which freight car door constructions are always subjected.

A further object of the invention is to provide in a weather strip construction in which the closing strip projects inwardly from the door, a strip of such cross sectional configuration that when the door is slid back and forth the sheathing of the car will not be scraped and injured as is frequently the case when weather strips projecting inwardly from the door are employed.

A further object of the invention is to provide a suitable bracket to receive the rear edge of the door when the door is in its extreme open position so formed as to hold the door from being forced against the side of the car to the injury of the inwardly projecting part of the weather strip.

The invention is shown in a preferred form in the accompanying drawings, wherein—

Figure 1 is a fragmentary side elevation of a car showing the sliding door provided with the devices of my invention; Fig. 2, a sectional plan, on an enlarged scale, taken on line 2—2 of Fig. 1; Fig. 3, a fragmentary elevation of the rear edge of the door showing the arrangement of the weather strip and one of the reinforcing knuckles; Fig. 4, a view, in perspective, of the knuckle; Fig. 5, a fragmentary side elevation of the car showing the bracket which receives the rear edge of the door when the door is opened; Fig. 6, a sectional plan view taken through the side wall of a car adjacent the bracket and through the door which is shown in its open position, and Fig. 7, a view, in perspective, of the nose piece at the rear edge of the door coöperating with the bracket.

Like characters of reference designate like parts in the several figures of the drawings.

Referring to the drawings, 10 designates the side sheathing of the car, 11 the sliding door which is movably supported on a track 12 by means of certain devices which, as they form no part of my present invention, need not be described.

13 designates a door post which stands back of the rear edge of the door when the latter is closed. Preferably the post 13 projects outwardly from the side sheathing 10 and has secured thereto by screws 14 the metal strip 15 which extends from the top of the doorway to the bottom. The weather strip, which coöperates with the strip 15, when the latter is employed, consists of a metal strip 16 secured by the screws 17 to the rear edge face of the door extending preferably from top to bottom of the door. The weather strip 16 projects inwardly from the door and is then bent or curved around acutely so that its forward edge extends outwardly. By giving this configuration to the projecting part of the weather strip a curved surface 18 is presented to the sheathing of the car so that if the weather strip is moved along in contact with the sheathing of the car the latter will not be scraped, marred or otherwise injured. The projection of the door post 13 beyond the sheathing prevents the weather strip from touching the sheathing when the door is closed or nearly closed, but the elasticity of the door and the looseness of mechanisms by which it is supported on the track make it quite possible for a projecting strip like the weather strip 16 to rub or be pressed against the side of the car when the door is in its open position or near it. With the strip formed as shown the strip will not scrape and mar the sheathing of the car at these places. Furthermore, by giving an outward inclination to the forward edge of the projecting part of the weather strip, that is, by constructing the strip with what may be termed a curved shoe, the strip will not so readily catch on nails or other obstructions on the outside of the car but will tend to ride over them. Freight cars, as is well known, are subject to a great deal of misuse. It is customary to drive nails into the side of the car for one purpose or another and to fasten strips of wood and the like to the car. Such obstructions as these are much less likely to interfere with an inwardly projecting weather strip if the latter is formed as shown than would be the case if, for example, the forwardly projecting edge of the strip stood at a right angle or at an obtuse angle to the plane of the door.

The cross sectional configuration of the weather strip by lessening the danger of the strip catching on an obstruction on the side of the car lessens correspondingly the danger of tearing the strip from its attachment to the door. The strip 16 is purposely secured to the edge face of the door in order to stiffen or reinforce the door and so prevent it from becoming warped. This method of attachment obviously makes bolting impossible. The strip is therefore secured to the door merely by the wood screws 17. To reinforce this attachment and furthermore to strengthen the strip and prevent it from becoming bent or distorted I employ one or more, preferably four, angular knuckles 19 which are secured to the outer face of the door by means of the bolts 20 and nuts 21 and which overlap and bear upon the strip 16. Preferably the angularly disposed arms of the knuckles stand at an angle to each other that is slightly acute in order to insure that the extremities of the knuckles should bear against the weather strip 16. These devices prevent the weather strip from being torn off or otherwise detached from the door or loosened and tend to keep it from becoming bent. They furthermore strengthen the door and protect its rear edge from injury. Preferably the knuckles are formed with the angular flanges 22 which stand so close to the nuts 21 as to prevent the nuts from turning with the vibration of the car.

Ordinarily in door constructions of the sort shown a bracket is provided on the side of the car which receives the lower rear corner of the door when the door is opened. With the door provided with a weather strip of the character described herein if the projecting part of the strip were allowed to come into contact with the bracket the strip would be very easily injured and bent. To prevent this I provide the bracket designated 23, with a projection 24 which holds the door in such position as to prevent the weather strip from coming into contact with the bracket. In the door construction shown a nose piece 25 (Fig. 7) is secured to the lower rear corner of the door, the nose piece being formed with a projecting nose 26 which fits into the bracket 23 forwardly of the projection 24.

I claim:

1. A weather and stiffening strip for freight car doors consisting of a strip of metal secured to the rear edge face of the door which projects inwardly therefrom and is formed with a forwardly extending bend, in combination with a nose piece on the door having a projecting nose, a bracket on the car, adapted to receive the rear edge of the door when the door is opened, formed with a recess which receives said nose so as to hold the projecting part of said weather strip out of contact with said bracket.

2. The combination with a sliding door, of a nose piece formed with a tapered nose which lies back of the face of the door and projects beyond the edge thereof, and a bracket formed with an obliquely disposed lip and with means constituting a pocket to receive said nose.

EDWARD A. HILL.

Witnesses:
P. H. TRUMAN,
L. A. FALKENBERG.

Copies of this patent may be obtained for five cents each, by addressing the "Commissioner of Patents, Washington, D. C."